INVENTOR
EARL E. EICKMEYER
ANTHONY G. HORVATH
BY
ATTORNEYS

Sept. 2, 1941.  E. E. EICKMEYER ET AL  2,254,421
VALVE
Original Filed May 23, 1938  5 Sheets-Sheet 3
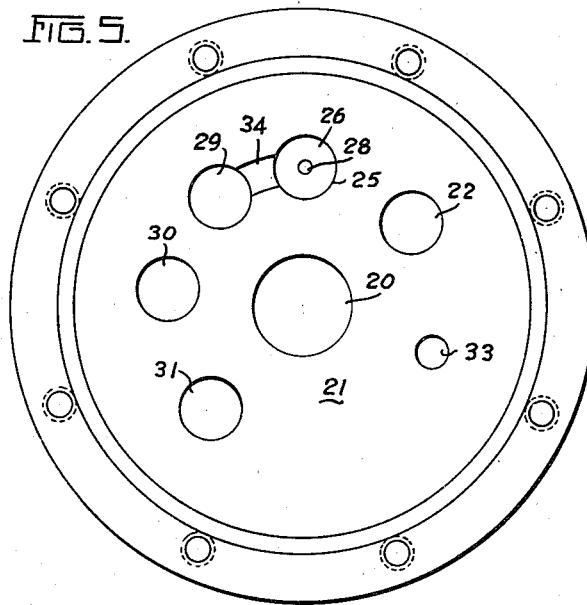
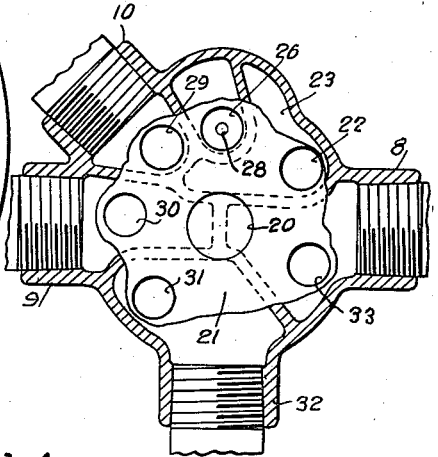
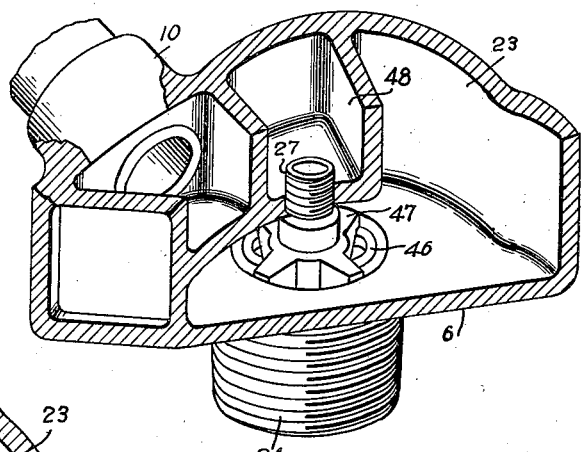
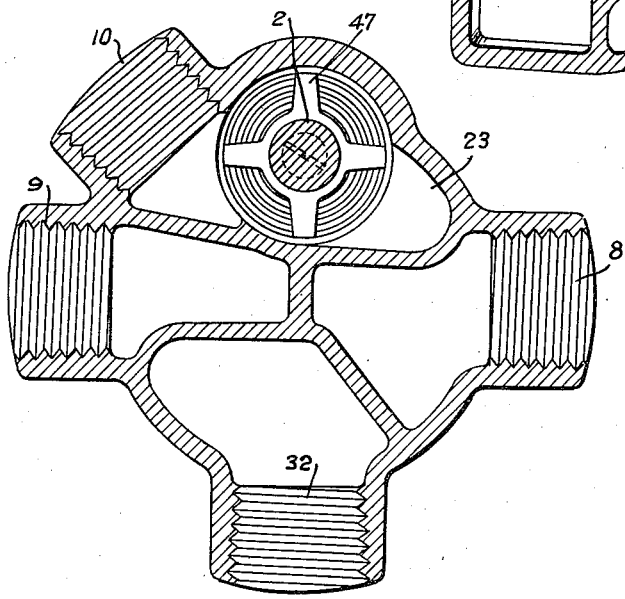
Inventors
EARL E. EICKMEYER,
ANTHONY G. HORVATH,
Attorneys Sept. 2, 1941. E. E. EICKMEYER ET AL 2,254,421
VALVE
Original Filed May 23, 1938 5 Sheets-Sheet 4

INVENTOR
EARL E. EICKMEYER
ANTHONY G. HORVATH
BY
ATTORNEYS

Patented Sept. 2, 1941

2,254,421

UNITED STATES PATENT OFFICE 2,254,421

VALVE

Earl E. Eickmeyer and Anthony G. Horvath, Dayton, Ohio, assignors to The Dayton Pump & Mfg. Company, Dayton, Ohio, a corporation of Ohio Original application May 23, 1938, Serial No. 209,458. Divided and this application April 21, 1939, Serial No. 269,194

10 Claims. (Cl. 210—24)

This invention relates to a valve and more particularly to a valve which is adapted to use in a water softening device and which provides a single control of the interconnecting of a plurality of liquid conduits in a number of different combinations. The valve of this invention is particularly adapted for the control for the successive operations of refilling, brining, washing and softening in the water softening process described in our co-pending application, Ser. No. 209,458, filed May 23, 1938, which has matured into Patent Ser. No. 2,245,767, June 17, 1941, of which this application is a division. Reference is also made to our co-pending application, Ser. No. 256,066, filed February 13, 1939, which is drawn to a water softening apparatus for use in carrying out the process of the first mentioned application.

The principal object of this invention is the provision of a valve having a single control, but which is adapted to simultaneously interconnect in different combinations several liquid carrying conduits in such manner as to establish communication between the same as desired.

It is another object of the invention to provide such a unitary control multiple valve which is especially suitable for use in the control of the several steps involved in water softening whereby the operator may by successive manipulations of a single control effect the successive operations required for water softening and regeneration of the active water softening mineral.

It is another object to provide in such a valve a rotor having a plurality of annular passageways, in conjunction with a stator which carries a plurality of ports connected with the pipes to be interconnected, said ports being of such dimensions and so located that predetermined combinations of a plurality of said ports may be interconnected by engagement of said ports with said annular passageways in said rotor.

It is another object to provide in a valve, of the type just described, annular passageways on the rotor and ports on the stator, both said passageways and said ports being disposed at the same radius from the center of the rotor and stator, and to provide centrally disposed locating means for said stator and rotor whereby said passageways are adapted to accurately connect various of said ports with one another.

Referring to the accompanying drawings:

Figure 5 is a section on the line 5, 5 of Figure 3 looking in the direction of the arrows;

Figure 6 is a section on the line 6, 6 of Figure 3 looking in the direction of the arrows;

Figure 13 is a plan view of the face of the distributor shown partially in elevation and partially in cross-section;

Figure 14 is a fragmentary perspective cross-sectional view showing the hard water inlet chamber and the outlet chamber to the top of the softener.

Figure 1:
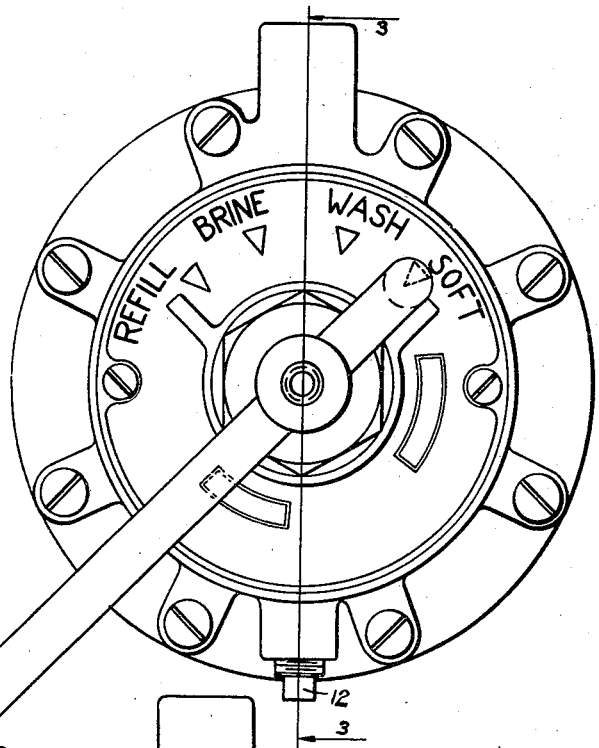
Figure 1 is a detailed front elevation of a single control valve embodying the present invention.
Figure 2:
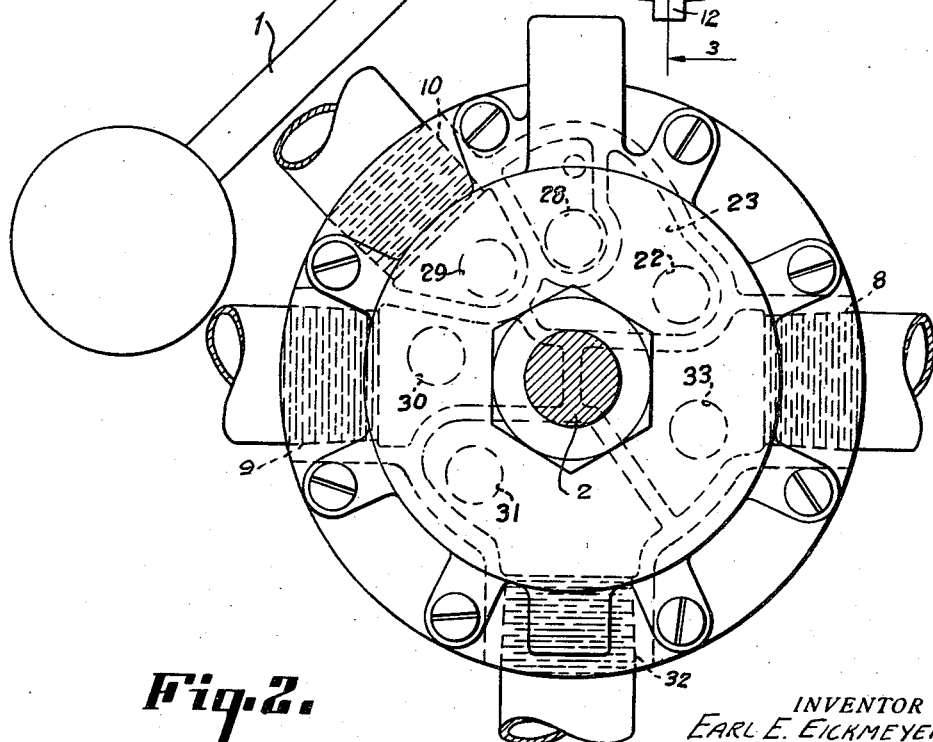
Figure 2 is a front elevation of the valve of Figure 1, with the rotor shaft in section, showing in dotted lines the compartments and ports in the stator of the valve and showing some of the conduits which are connected to the stator of the valve.

Referring to the drawings in detail the valve consists of a valve operating handle 1 which is mounted upon and rotates a shaft 2 upon which is mounted a rotor 3 which operates within a cover 4 and which operates against the face 5 of a distribution head or stator 6, the rear end of which is connected to the pipe 7 which is connected to the top of the water softener tank. The right-hand side of stator 6 is connected at 8 to a drain pipe. Outlet 9 at the left-hand side of the stator is adapted to be connected to a service pipe which supplies the household with soft water.

Reference numeral 10 designates an inlet which is adapted to be connected to a source of hard water to be softened. Reference numeral 11 designates an inlet disposed in the cover of the valve which is adapted to be connected to a source of brine which is to be employed in the regeneration. The bottom of the cover casing 4 is provided with a plug 12 upon which is mounted a spring 13, which presses inwardly an indexing finger 14 into a shouldered portion 15 of the rotor 3, so that the positioning of the rotor 3 at its several positions by the handle 1 will be indicated to the operator, spring-pressed plunger 14 being adapted to be pressed into a series of depressions on the periphery of the rotor, there being one depression for each position in which the rotor is to be set by handle 1.

Rotor 3 turns with shaft 2 which is supported within the cover 4 in the bearing 16, which is provided with a packing 17 and packing gland 18. A pin 19 mounted in the shaft 2 engages with the inside of cover 4 so as to retain shaft 2. The inner end of shaft 2 is journaled in a recess 20 in one face of stator 6.

Figures 8 to 12 illustrate the construction of rotor 3, particularly with respect to its face which is adjacent stator 6 and the positioning of rotor 3 with respect to the ports in stator 6. Figure 5 shows the face 21 of the stator 6, which has a plurality of ports which cooperate with grooves 35 and 36 in the face of rotor 3. The relative positioning of the rotor grooves with respect to the ports in stator 6 determines the distribution of the fluid in the valve of this invention. The port 22 in stator 6 communicates through passageway 23 with outlet 24 which is in communication with pipe 7 leading to the top of the water softener. Port 25 in the stator has mounted therein the jet device 26 which is used in connection with the injector 27 as will be herein described. Jet device 26 has therethrough a longitudinal orifice 28 which is adapted to direct a jet of fluid rearwardly from a cooperating groove in the stator through the injector 27 whereby to bring about a suction action of said jet. Port 29 in the stator communicates with hard water inlet 10. Port 30 communicates with the house service pipe which is connected to outlet 9. Port 31 communicates with outlet 32 which is in communication with the bottom of the softener. Port 33 communicates with outlet 8 in the body of the stator which is connected to a drain pipe leading to the sewer. Connecting ports 29 and 25 is a groove 34 in the face of the stator so that hard water coming through port 29 may always pass into the jet device 26 and rearwardly through orifice 28 even though the grooves of the rotor are in such a position that they do not establish fluid communication between ports 29 and 25.

Figure 3:
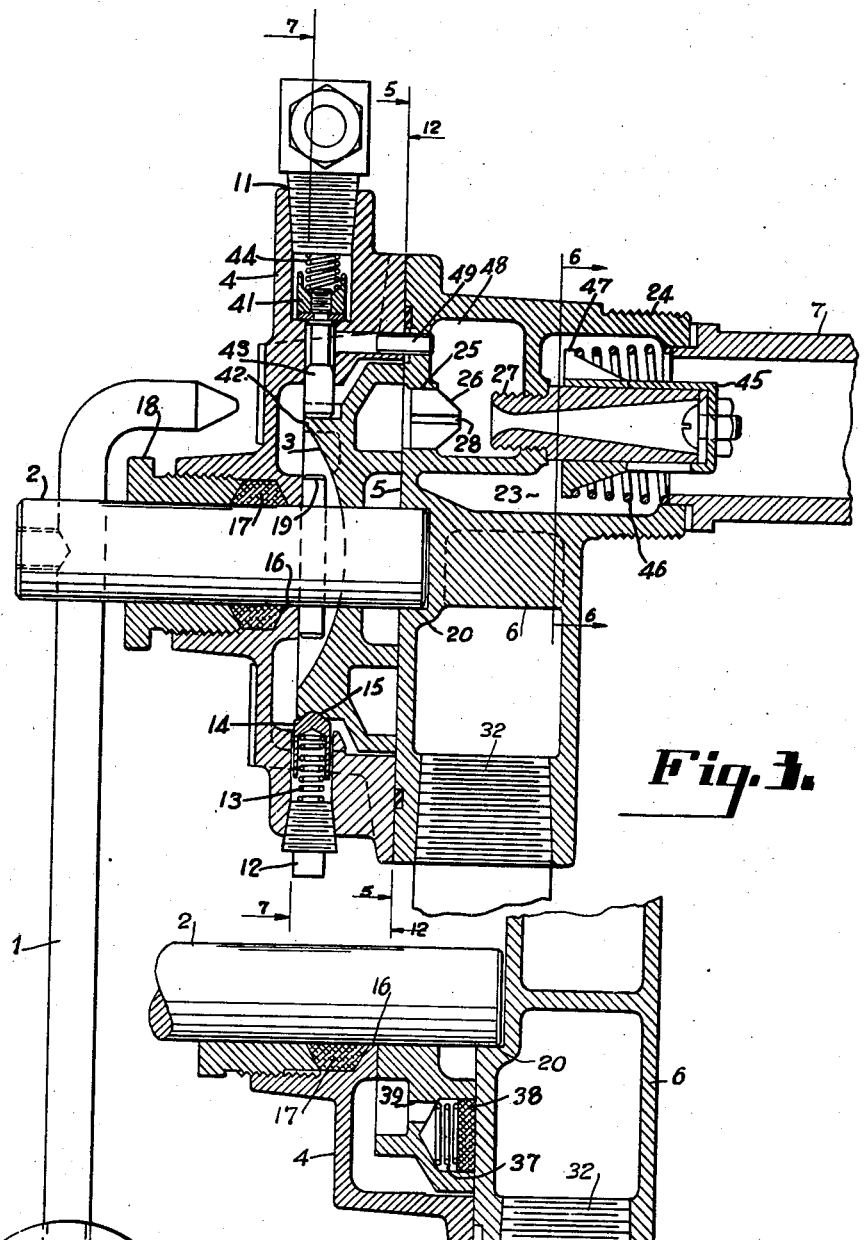
Figure 3 is a section on the line 3, 3 of Figure 1 looking in the direction of the arrows.
Figure 4:
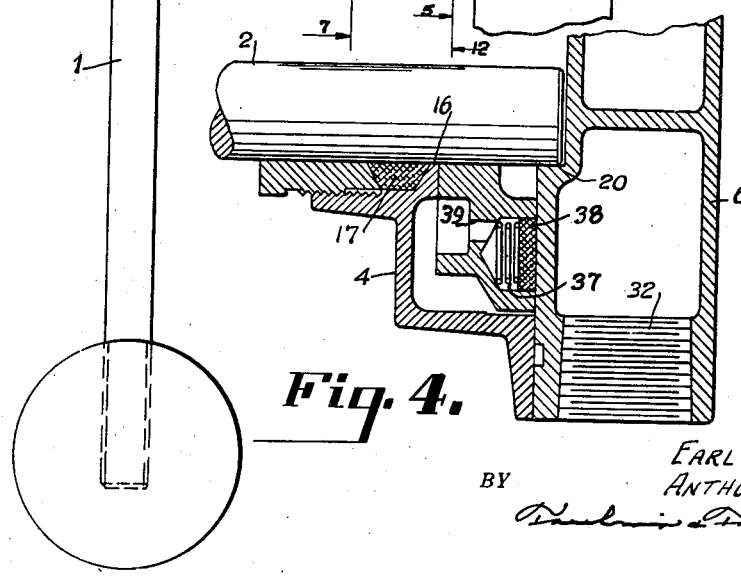
Figure 4 is a detailed section showing a modification of the valve structure of Figures 1 to 3.
Figure 7:
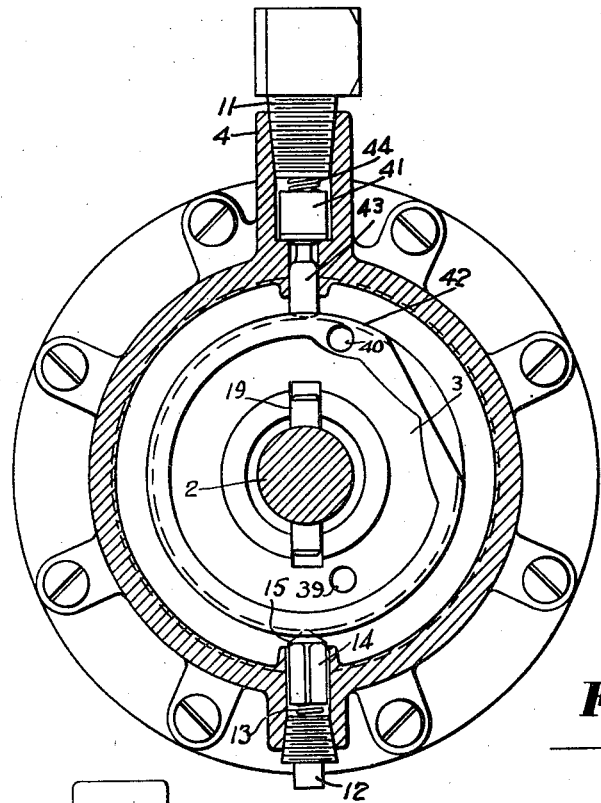
Figure 7 is a section on the line 7, 7 of Figure 3 looking in the direction of the arrows.
Figure 8:
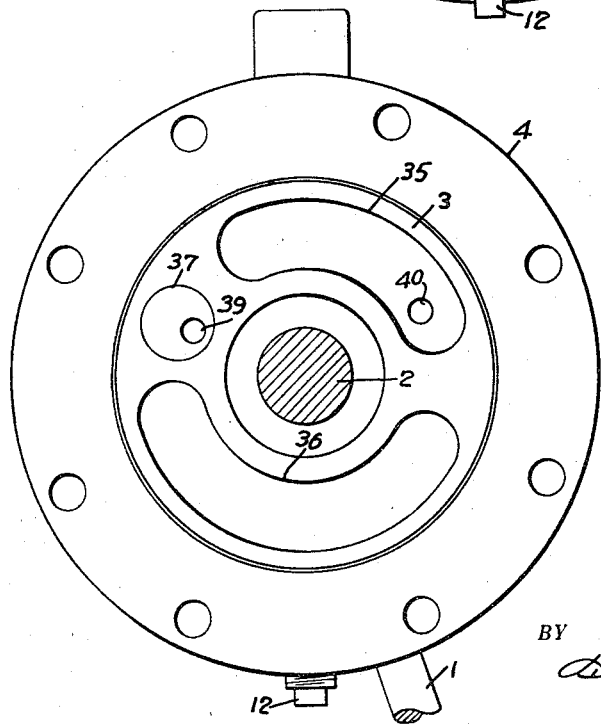
Figure 8 is a section on the line 12, 12 of Figure 3 looking in the direction of the arrows.

Referring to Figure 8 the construction of the inside face of rotor 3 is shown. This rotor has an annular groove 35 which is disposed at the same distance from the axis of the valve as the ports in the stator 6. Rotor 3 has another groove 36 which is similarly disposed on the other side of the rotor. Intermediate between the ends of grooves 35 and 36 is a port 37 which may or may not, as desired, be provided with a spring-pressed plate 38 (compare Figures 3 and 4). Port 37 is provided with an orifice 39 leading rearwardly to the compartment between the rotor 3 and the cover 4. In the following description it will be assumed that spring-pressed plate 38 is employed in port 37 and the function of this spring-pressed plate will be described. Port 39 allows fluid pressure of the incoming city water to act upon spring-pressed plate 38 thereby forcing it into still tighter engagement with the face of the stator 6. Where spring-pressed plate 38 is not employed, orifice 39 is dispensed with as will be apparent from a comparison of Figures 3 and 4.

Groove 35 of stator 3 is provided with an orifice 40 which leads to the chamber formed between rotor 3 and cover 4 whereby to establish fluid communication between groove 35 and the space behind the rotor 3 so that the fluid pressure of the incoming city water will be transmitted to the rear face of the rotor and will press it into firm engagement with the face of stator 6.

Figure 9:
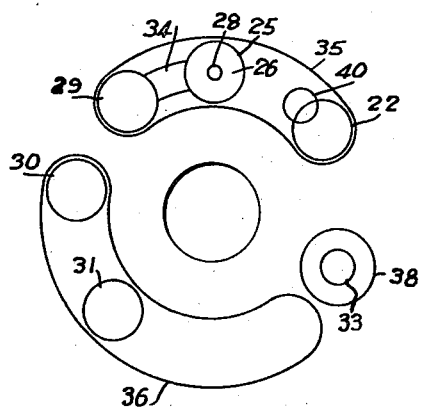
Figure 9 is a diagrammatic view showing the arrangement of the rotor grooves with respect to the distributor or stator ports when the rotor is set in the position for the softening step.
Figure 12:
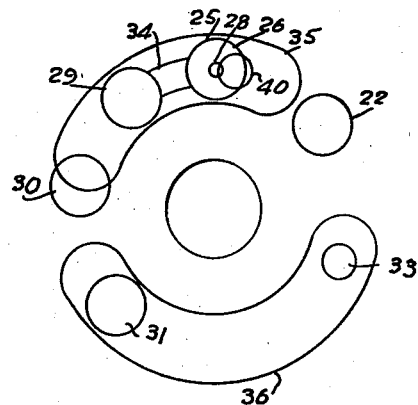
Figure 12 is a similar view showing the parts in position for washing the base-exchange mineral in the softener in order to free it from brine and from the soluble products of regeneration after the brining of the softener.

Referring to Figure 9 which illustrates the softening position of the mechanism, the hard water coming in through port 29 is connected by groove 35 to port 22 which is in communication with the top of the softener. The port 31 which is connected to the bottom of the softener is connected by groove 36 to port 30 which is in communication with the house service line. Orifice 33 is positively closed by spring-pressed plate 38 illustrated in Figure 4. Consequently the valve parts are so disposed as to bring about the down-flow of the hard water through the mineral bed in the softener tank and flow of the softened water from the bottom of the mineral bed to the house service line. In addition to hard water communicating with outlet 24 leading to the top of the softener by means of port 22, hard water is also communicated to said outlet 24 by reason of the fluid communication of jet device 26 located in port 25 with port 29 by means of both groove 34 in the stator and groove 35 in the rotor, although the amount of hard water passing into outlet 24 through the orifice in jet device 26 will not be nearly as great as the amount passing thereinto through port 22.

Figure 10:
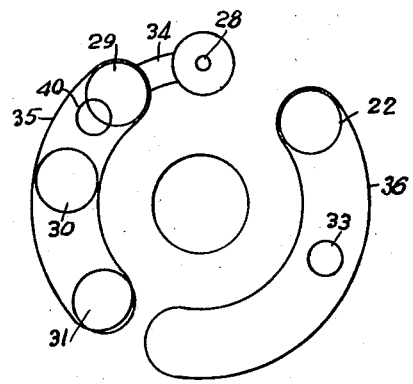
Figure 10 is a similar diagrammatic view showing the disposition of the rotor grooves and the stator ports when the valve is set for refilling the brine tank with water and for washing the mineral in the softening tank in the opposite direction to that in which water normally flows through the softener bed in being softened.

Referring to Figure 10 which illustrates the parts in a position for simultaneously refilling of the brine tank with hard water whereby to provide a supply of brine and upward washing of the mineral in the softener, it will be observed that the groove 35 now bridges the hard water port 29, the port 30 and the port 31 leading to the bottom of the water softener whereby hard water is passed both to the serve line and to the bottom of the water softener. The port 28 in jet device 26 is now provided with incoming hard water through groove 34. The groove 36 spans the port 22 and the port 33, whereby the top of the water softener in communication with port 22 is connected to the drain in communication with port 33. Thus, the softener bed is washed upwardly with hard water and the washing water after passing through the bed is led to the drain and none of this dirty water gets into the refill water for the brine tank. At the same time hard water is being delivered from the chamber in communication with port 29 through the valve to outlet 11 which is in communication with the brine tank whereby to refill the brine tank with additional water to provide another supply of brine for the regeneration operation that will next occur.

The hard water for this purpose enters the port 29, passes through the passageway 34, makes its exit through jet 26 and thence through chamber 48 and passageway 49 to the valve 41 and outwardly through outlet 11 to the brine tank. In order to do this the cam shoulder 42 on the periphery of the rotor 3 has lifted the pin 43 against the spring 44 and has lifted the valve member 41. Since outlet 24 is now in communication with the drain by means of groove 36 which spans ports 22 and 33 injector 27 is now closed by the force of water against injector cover 45 so that hard water passing through the orifice 28 of jet 26 is compelled through passageway 48 and orifice 49 to valve 41 in the manner just described.

In Figure 10 it will be noted that the groove 36 only connects the top of the softener through port 22 from which the dirty water is moving to the drain port 33 and there is no way by which this dirty water could be introduced into the brine tank.

Figure 11:
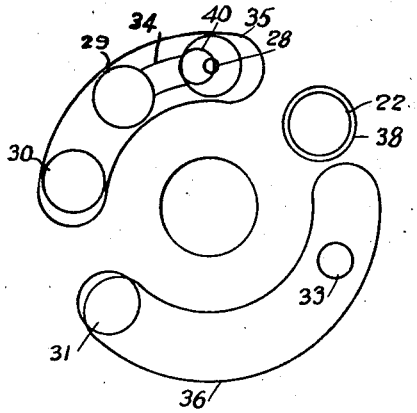
Figure 11 is a similar view showing the parts in position of passing brine from the source of brine to the softener containing the base-exchange mineral.

Referring to Figure 11 which illustrates the position of the rotor and stator for the brining wherein brine is to be passed downwardly into the softener, the groove 36 of the rotor spans the drain port 33 and the port 31 connected to the bottom of the softener whereby liquid passing out of the bottom of the softener is connected to the sewer. The spring-pressed plate 38 in recess 37 is over the opening 22 leading to the top of the softener. The groove 35 spans the jet opening 28, the hard water port 29 and the service port 30. By this arrangement the city water or hard water is connected to the service line for the dwelling using the soft water and the jet opening 28 is supplied with hard water so as to induce the flow of brine from brine inlet 11 through the injector 27 to the top of the softener, whence the brine passes through the softener bed, out the bottom and thence through port 31, groove 36 and out port 33 to the sewer. The force of this injected water passing through the injector 27 lifts the cover sleeve 45 which is over the injector 27 and is normally closed by spring 46 pressing against the member 47. The opening to the brine inlet 11 is effected by the cam surface 42 lifting the pin 43 and thereby opening the valve 41 against the spring 44 allowing brine to be sucked into the chamber 48 through orifice 49 and thence to mingle with the water passing through jet 27 and thence going into the top of the softener through outlet 24. Thus, the house service line is supplied with hard water temporarily and the top of the softener is supplied with brine and the bottom of the softener is connected with the sewer.

Referring to Figure 16 which illustrates the position of the parts during the washing operation which follows the brining of the mineral softener, the rotor groove 35 spans the jet opening 28, the hard water port 29, and the port 30 connected with the service line. Groove 36 spans the port 31 which is in communication with the bottom of the softener and the drain port 33. In this position the hard water is connected to the service line and to the injector jet 26. The bottom of the softener is connected through groove 36 to the drain port 33. The water is flowing downwardly through the softener bed at this time. In this way the household or building connected to the service line is being supplied with hard water while the washing operation is washing the accumulated brine and salts from the mineral out to the sewer.

It will be understood that it is desired to comprehend within this invention such modifications as come within the scope of the claims and the invention.

Having thus fully described our invention what we claim and desire to secure by Letters Patent is:

1. In a valve, a stator having an inlet passage and a plurality of outlet passages, a plurality of ports in one face thereof communicating with said passages, a rotor having a passageway in a face thereof which is disposed adjacent said face of said stator, a cover associated with said stator forming an enclosure therewith for said rotor, said rotor passageway being adapted to interconnect less than all of said ports with one another, and a groove in the face of said stator between the port communicating with said inlet passage and one of said ports communicating with said outlet passages to interconnect said two ports regardless of the position of the rotor with respect to the stator whereby fluid flow can be maintained through said one port at all times irrespective of the interconnection of the other ports.

2. In combination, in a water softening control valve, a cover, a distributor associated with said cover and forming therewith a valve body, a rotor mounted within said body, said rotor having a plurality of passageways in one face thereof, said distributor having one face adjacent said rotor and having a plurality of ports therein arranged to be successively placed in communication with the passageways in said rotor, a hard water inlet passage connected to one of said ports, the other of said ports being connected to passages directed exteriorly of said body, a jet means in one of said distributor ports, an injector associated therewith for directing flow therethrough to one of said exteriorly directed distributor passages, a brine inlet passage in said body communicating with the inlet of said injector, and yielding means normally adapted to close said injector to divert the normal flow therethrough during a portion of the cycle of operation of the water softening system.

3. In a single control valve for a water softening system comprising a cover, a distributor associated with said cover and forming therewith a valve body, a rotor mounted in a chamber therein, means for rotatably supporting the rotor, said rotor having arcuate grooves in one face thereof, said distributor having a face thereof adjacent the grooved face of said rotor and having a plurality of chambers associated therewith having inner ports adapted to communicate with said grooves and outer ports adapted to communicate with the connecting pipes of the water softening system one of which is the hard water supply, a jet means in one of said distributor ports communicating with said rotor, an injector in communication with one of said chambers of the distributor and with said jet, a brine inlet passage in communication with the inlet side of said injector, and yielding means for normally closing the outer end of said injector adapted to be opened by the force of liquid being ejected therethrough.

4. In a single control valve for a water softening system comprising a cover, a distributor associated with said cover and forming therewith a valve body, a rotor mounted in a chamber therein, means for rotatably supporting the rotor, said rotor having arcuate grooves in one face thereof, said distributor having a face thereof adjacent the grooved face of said rotor and having a plurality of chambers associated therewith having inner ports adapted to communicate with said grooves and outer ports adapted to communicate with the connecting pipes of the water softening system one of which is the hard water supply, a jet means in one of said distributor ports communicating with said rotor, an injector in communication with one of said chambers of the distributor and with said jet, a brine inlet passage in communication with the inlet side of said injector, yielding means for normally closing the outer end of said injector adapted to be opened by the force of liquid being ejected therethrough, cam means on one face of said rotor, and a normally closed valve in said brine inlet having means to engage said cam, whereby said valve is opened upon rotation of said rotor to provide communication between said brine inlet and said ejector.

5. In a single control valve for a water softening system comprising a cover, a rotor mounted in a chamber therein, means of pivotally supporting the rotor, said rotor having arcuate grooves in one face thereof, a distributor mounted adjacent the face of said rotor and cover having a plurality of chambers with inner ports adapted to communicate with said grooves and outer ports adapted to communicate with the water softening apparatus, a jet means in one of said distributor ports communicating with said rotor, an injector in communication with one of said chambers of the distributor and with said jet, yielding means for normally closing the outer end of said injector adapted to be opened by the force of liquid being ejected therethrough, said control valve having one position of operation wherein the injector is opened by water pressure through the jet to draw brine through the brine line and another position of operation wherein the injector is closed by the yielding means to prevent return flow of water flowing through the softener to the brine line.

6. In a single control water softener valve, a stator having a plurality of circularly disposed spaced ports in its forward face, said ports being in communication with chambers provided in said stator, said chambers having outlets adapted to be connected to fluid conduits one of which is a hard water supply conduit, a jet device in one of said ports, an injector mounted therebehind through which said jet device is adapted to project a jet of liquid at high speed through said injector into a space therebehind, a second one of said ports being in fluid communication with said space, said space being in fluid communication with a fluid conducting conduit, spring-pressed means normally closing said injector forwardly and adapted to be opened by the force of said jet at times other than when liquid is moving forwardly in said space, a brine inlet passage in said stator communicating with the inlet side of said injector, a rotor rotatably mounted against said stator face, a cover cooperating with said stator to enclose said rotor, and passages in the face of said rotor contacting said stator to variously interconnect said ports when said rotor is rotated to various positions.

7. In a single control water softener valve, a stator having a plurality of circularly disposed spaced ports in its forward face, said ports being in communication with chambers in said stator, said chambers having outlets adapted to be connected to fluid conduits one of which is a hard water supply conduit, a rotor having one face contacting said stator face and having grooves in its contacting face adapted to variously interconnect said ports, a cover cooperating with said stator to enclose said rotor, a jet device mounted in said stator face and adapted to project a jet of liquid rearwardly, means connecting said jet device at all times with a supply of liquid to be jetted therein, an injector behind said jet device adapted to receive the jet therefrom and in communication with a rearward space, said space being in communication with a fluid conducting conduit, one of said ports having its chamber in free communication with said space, a second chamber between said jet device and said injector through which liquid is sucked by said injector and jet device and into which said jet is received when said injector is closed off, a brine inlet passage in communication with said second chamber, and check valve means in operative association with said injector normally urged to close said injector, said valve being opened by the force of said jet when liquid is flowing rearwardly in said space and closed when liquid is flowing forwardly in said rearward space.

8. In combination, in a water softening control valve, a stator having a hard water inlet opening, a plurality of ports in one face of said stator, one of said ports communicating with said hard water inlet and the other of said ports communicating with fluid conducting conduits directed exteriorly of said stator, a rotor having a plurality of passageways in a face disposed adjacent said face of said stator, a cover associated with said stator forming therewith an enclosure for said rotor, said rotor passageways being adapted to interconnect said ports in said stator in various combinations to direct the flow of water through the softener, two of said ports communicating with a common outlet, one of said two ports including an injector, check valve means for closing said injector, and means for conducting brine to the inlet side of said injector, said water softening control valve having one position of operation wherein said two openings operate in parallel and having another position of operation wherein said check valve closes said injector to prevent same from functioning.

9. A single control valve for a water softening system comprising a cover, a rotor mounted in a chamber therein, means for rotatably supporting the rotor, said rotor having arcuate grooves in one face thereof, a distributor mounted adjacent the face of said rotor and cover having a plurality of chambers with inner ports adapted to communicate with said grooves and outer ports adapted to communicate with the conduits of a water softening system, one of which conduits is a hard water supply, a jet means in one of said distributor ports communicating with said rotor, an injector in communication with one of said chambers of the distributor and with said jet, means for conducting brine to the suction side of said injector, a valve surrounding said injector, and spring means normally urging said valve into closed position against the end of the injector.

10. A single control valve for a water softening system comprising a cover, a rotor mounted in a chamber therein, means for rotatably supporting the rotor, said rotor having arcuate grooves in one face thereof, a distributor mounted adjacent the face of said rotor and cover having a plurality of chambers with inner ports adapted to communicate with said grooves and outer ports adapted to communicate with the conduits of a water softening system, one of which conduits is a hard water supply, a jet means in one of said distributor ports communicating with said rotor, an injector in communication with one of said chambers of the distributor and with said jet, means for conducting brine to the suction side of said injector, a sleeve type valve surrounding said injector and having one end thereof closed, said valve being slidable upon said injector, a passageway in said sleeve, and spring means normally urging said sleeve valve into position to close said passageway.

EARL E. EICKMEYER.
ANTHONY G. HORVATH.